(12) United States Patent
Shiraki et al.

(10) Patent No.: US 8,577,213 B2
(45) Date of Patent: Nov. 5, 2013

(54) LENS DRIVING DEVICE, AUTOFOCUS CAMERA AND CAMERA-EQUIPPED MOBILE TERMINAL

(75) Inventors: Manabu Shiraki, Kanagawa (JP); Kazuhiro Ichikawa, Kanagawa (JP)

(73) Assignee: New Shicoh Technology Co., Ltd., Kanagawa (JP)

( * ) Notice: Subject to any disclaimer, the term of this patent is extended or adjusted under 35 U.S.C. 154(b) by 96 days.

(21) Appl. No.: 13/112,320

(22) Filed: May 20, 2011

(65) Prior Publication Data

US 2011/0286099 A1    Nov. 24, 2011

(30) Foreign Application Priority Data

May 24, 2010  (JP) .................................. 2010-118659
Nov. 24, 2010  (JP) .................................. 2010-261015

(51) Int. Cl.
*G03B 17/00* (2006.01)

(52) U.S. Cl.
USPC ............................................................ 396/52

(58) Field of Classification Search
USPC ..................................................... 396/52, 55
See application file for complete search history.

(56) References Cited

U.S. PATENT DOCUMENTS

| | | | |
|---|---|---|---|
| 6,195,314 B1 * | 2/2001 | Inui et al. ..................... | 369/44.14 |
| 7,203,951 B2 * | 4/2007 | Kawano et al. ............... | 720/683 |
| 7,917,023 B2 * | 3/2011 | Chiang ........................... | 396/55 |
| 2004/0017621 A1 * | 1/2004 | Suzuki et al. .................. | 359/824 |
| 2009/0219633 A1 * | 9/2009 | Li et al. .......................... | 359/814 |
| 2010/0002317 A1 * | 1/2010 | Osaka et al. .................. | 359/824 |
| 2011/0096178 A1 * | 4/2011 | Ryu et al. ................... | 348/208.2 |
| 2011/0122745 A1 * | 5/2011 | Komma et al. ............. | 369/44.14 |

FOREIGN PATENT DOCUMENTS

JP    2002-373435    12/2002

\* cited by examiner

*Primary Examiner* — Rodney Fuller
*Assistant Examiner* — Linda B Smith
(74) *Attorney, Agent, or Firm* — Dilworth & Barrese, LLP.

(57) ABSTRACT

In the lens driving device of the present invention, at least two second coils are disposed at a 90 degree interval in a circumferential direction of a first coil wound around an outer circumference of a lens support in the circumferential direction, at least four magnets are provided at an inner circumferential side of a circumferential wall of a yoke and are provided at even intervals about the circumferential direction of the first coil, each magnet being provided so that an inner circumferential face is the same magnetic pole and opposes an outer circumferential face of the first coil, and in addition is opposite the second coil at the position of providing the second coil. When the lens support is moved in the optical axis direction, an electric current flows in the first coil, and when the lens support is moved in an X-Y direction orthogonal to the optical axis, a predetermined electric current flows in a predetermined second coil.

11 Claims, 12 Drawing Sheets

FIG. 2
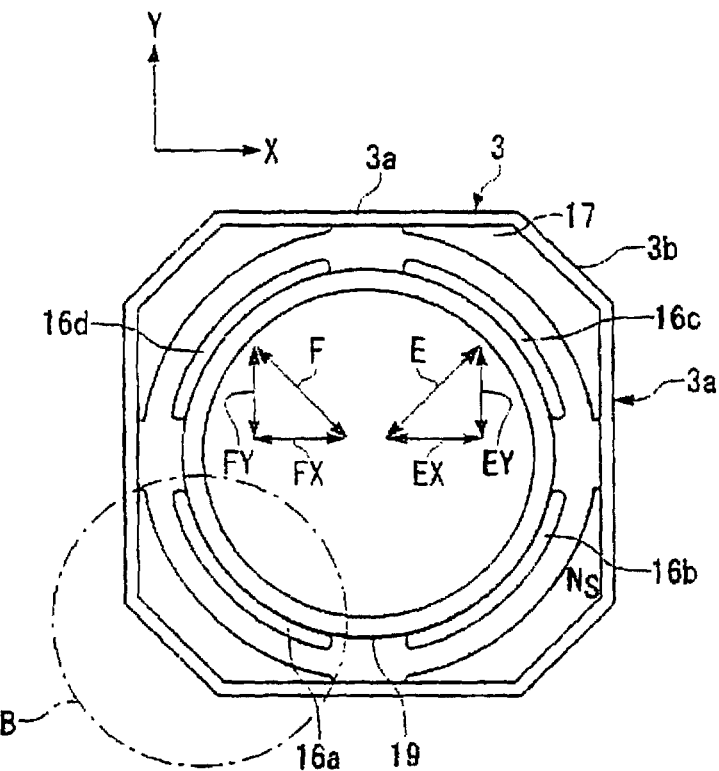
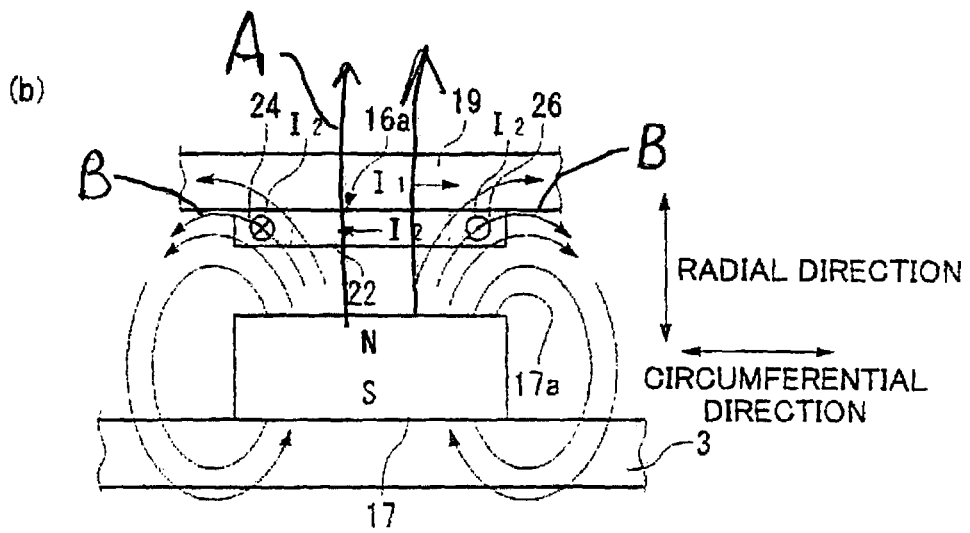

LENS DRIVING DEVICE, AUTOFOCUS CAMERA AND CAMERA-EQUIPPED MOBILE TERMINAL

This application is based on and claims the benefit of priority from Japanese Patent Application Nos. 2010-118659 and 2010-261015, respectively filed on 24 May 2010 and 24 Nov. 2010, the contents of which are incorporated herein by reference.

BACKGROUND OF THE INVENTION

1. Field of the Invention

The present invention relates to a lens driving device for moving a lens in an optical axis direction, to an autofocus camera provided with this lens driving device, and to a camera-equipped mobile terminal provided with this autofocus camera.

2. Related Art

Patent Publication 1 (Japanese Unexamined Publication No. 2002-373435) discloses that, in an actuator for an optical pickup, a lens support is moved in an optical axis direction (focus direction) and tracking direction (X direction) by providing a first coil and a second coil at a 90 degree interval in the circumferential direction of the outer circumferential face of the lens support body, disposing magnets facing each coil at the radial direction outer side of the lens support body, and passing electric current though the coils.

On the other hand, in a miniaturized camera, the lens support was moved only in the optical axis direction, and for the case of moving in the X-Y direction for image stabilization, the whole lens driving device was moved by a motor for driving in the X direction and a motor for driving in the Y direction.

SUMMARY OF THE INVENTION

Namely, in the prior art, in a lens driving device for a miniaturized camera, to move only a lens support so as to move in the optical axis direction (Z direction) and move in the X-Y direction (image stabilization) of the lens support has not been carried out.

Further, even though it was possible to move the lens support in the optical axis direction using the technique of Patent Publication 1, it is possible to move only in the X axis direction in the technique of Patent Publication 1, and image stabilization (movement in the X-Y direction (the plane orthogonal to the optical axis)) is not possible.

The present invention has the objective of providing a lens driving device, an autofocus camera, and a camera-equipped mobile terminal where a lens support can be moved in an optical axis direction and moved for image stabilization.

In order to solve the above problem, the first aspect of the invention is a lens driving device for moving a lens in an optical axis direction, comprising:

a lens support for supporting a lens in an inner circumference;

a fixed member which supports so as to be freely moveable the lens support at an inner circumferential side;

a first coil wound around an outer circumference of the lens support in a circumferential direction;

at least two second coils disposed with a 90 degree interval in the circumferential direction at the outer circumference of the lens support, the second coils having a toroidal form when seen from a radial direction outer side of the lens support;

at least four magnets provided at the fixed member, and provided at a predetermined interval about the circumferential direction of the first coil, each magnet being provided so that an inner circumferential face is the same magnetic pole, and so that the inner circumferential face is opposite an outer circumferential face of the first coil, and in addition is opposite a radial direction outer side face of the lens support at the second coil at the position of providing the second coil; wherein when moving the lens support in the optical axis direction, an electric current flows in the first coil, and when moving the lens support in an X-Y direction orthogonal to the optical axis, a predetermined electric current flows in a predetermined second coil.

The second aspect of the invention is a lens driving device for driving a lens in an optical axis direction comprising:

a lens support which supports a lens in an inner circumference;

a fixed member which supports so as to be freely moveable the lens support at an inner circumferential side;

a first coil wound around an outer circumference of the lens support in a circumferential direction;

at least two second coils disposed with a 90 degree interval in the circumferential direction at the outer circumference of the lens support, the second coils having a toroidal form when seen from a radial direction outer side of the lens support;

a toroidal magnet provided at the fixed member, and provided along the circumferential direction of the first coil, the magnet being provided so that magnetic poles of an inner circumferential face and an outer circumferential face are different, and so that the inner circumferential face is opposite the outer circumferential face of the first coil, and in addition is opposite a radial direction outer side face of the lens support body at the second coil at a position of providing the second coil; wherein when moving the lens support in the optical axis direction, an electric current flows in the first coil, and when moving the lens support in an X-Y direction orthogonal to the optical axis, a predetermined electric current flows in a predetermined second coil.

According to the first and second aspects of the invention, in the focusing movement of the lens support (movement in the optical axis direction), the lens support is moved in the optical axis direction by a thrust in the optical axis direction of the lens arising between the magnet and the first coil by passing a current therethrough; and the image stabilization is carried out by moving the lens support in the X-Y direction by a thrust in a radial direction of the lens support arising between a magnet and an predetermined second coil by passing a current therethrough. In this way, the focusing movement and the image stabilization movement of the lens support are possible.

The direction of the magnetic flux leaving from the right (left) side portion of the inner circumferential face of the magnet has components in the radial direction inner direction and the circumferential direction right (left) direction, which curve further towards the right (left) side further away from the inner circumferential face of the magnet. Namely, the direction of the magnetic flux has components in the radial direction inner direction and in the left and right directions with respect to the radial direction. In the same way, the magnetic flux leaving from the front side portion of the inner circumferential face of the magnet curve further towards the front direction side further away from the inner circumferential face. Further, the direction of the magnetic flux leaving from the rear side portion of the inner circumferential face of the magnet has components in the radial direction inner direction and the optical axis direction, and curve further towards the rear direction side further away from the inner circumferential side.

For example, when an electric current is made to flow in the counterclockwise direction seen from the front direction side in the first coil, flux linkage components in the radial direction inner direction contribute to the generation of a thrust in the optical axis direction front direction by Fleming's right hand rule, and the lens support body moves in the optical axis direction front direction.

On the other hand, when an electric current is made to flow in the clockwise direction seen from the outer direction in the second coil, the flux linkage components in the optical axis direction front direction contribute to the generation of a thrust in the radial direction inner direction at the front side portion of the second coil. In the same way, a thrust is also generated in the radial direction inner direction at the rear side portion, right side portion and left side portion of the second coil. As a result, the lens support moves in the radial direction inner direction.

Moreover, according to the first aspect of the invention, the magnets simultaneously serve for moving in the optical axis direction and for moving in the X-Y direction, and it is possible to move the lens support in the optical axis direction and in the X-Y direction with a first coil, at least two second coils, and at least two magnets, thus it is possible to carry out focusing movement and image stabilization movement of the lens support with a simple constitution and a small number of parts.

Further, according to the second aspect of the invention, the magnet simultaneously serves for moving in the optical axis direction and for moving in the X-Y direction, and the lens support can be moved in the optical axis direction and moved in the X-Y direction by a first coil, at least two second coils, and one magnet, thus it is possible to carry out focusing movement and image stabilization movement of the lens support with a simple constitution and with a small number of parts.

In the first aspect of the invention, the fixed member is provided with a yoke having a outer circumferential side wall at the outer circumferential side of the magnet, and the yoke is formed such that the outer circumferential wall has an approximately planar view square shape when seen form the front side, and the magnet and the second coil are preferably disposed at the corner portions of the yoke.

By disposing the magnet and the second coil which functions for image stabilization at the corner portions having depth of a square shape, it is possible to have an image stabilization function while constituting the lens driving device so as to have the same size as one which does not provide image stabilization, and make the constitution compact. Further, by the yoke, it is possible to increase the magnetic flux density of the magnet.

In the first and second aspects of the invention, the fixed member is provided with a toroidal yoke, and the yoke is provided with an outer circumferential side wall, an inner circumferential side wall positioned at the inner circumference of the outer circumferential side wall, and a connecting wall which connects the inner circumferential side wall and the outer circumferential side wall, the magnet is provided at the inner circumferential side of the outer circumferential side wall of the yoke, and the inner circumferential side wall of the yoke is preferably disposed between the lens support and the first coil.

Because the magnetic flux density crossing the first coil can be increased between the inner circumferential side wall and the outer circumferential side wall of the yoke, it is possible to increase the thrust acting on the first coil in the Z direction.

In the first and second aspects of the invention, it is preferable to provide a plurality of the first coils in the optical axis direction, and to provide the second coils and the magnets to correspond to each of the first coils.

A plurality of the first coils contributing to the movement in the optical axis direction is provided, and a plurality of the second coils contributing to the movement in the X-Y direction is provided, thus it is possible to increase the thrust in the optical axis direction and the thrust in the X-Y direction of the lens support.

The third aspect of the invention is an autofocus camera comprising the lens driving device according to the first or second aspect, and an image sensor provided at an image forming side of the lens of the lens support.

According to the third aspect of the invention, it is possible to provide an autofocus camera showing the effects of the above described first and second aspects of the invention.

The fourth aspect of the invention is a camera-equipped mobile terminal comprising the autofocus camera of the invention according to the third aspect.

The mobile terminal is a mobile phone, personal digital assistant (PDA), notebook computer or the like.

According to the fourth aspect of the invention, it is possible to provide a camera-equipped mobile terminal showing the effects of the third aspect of the invention.

BRIEF DESCRIPTION OF THE DRAWINGS

FIG. 2 shows a lens driving device according to the first embodiment, (a) is a horizontal cross sectional view of the lens driving device according to the first embodiment, and (b) is a drawing schematically showing the operation of the B portion shown in (a).

EXAMPLES

Below, an embodiment of the present invention will be explained in detail referring to FIGS. 1 to 5 of the attached drawings. The lens driving device 1 according the present embodiment is a lens driving device of an autofocus camera built into a mobile phone.

Figure 1:
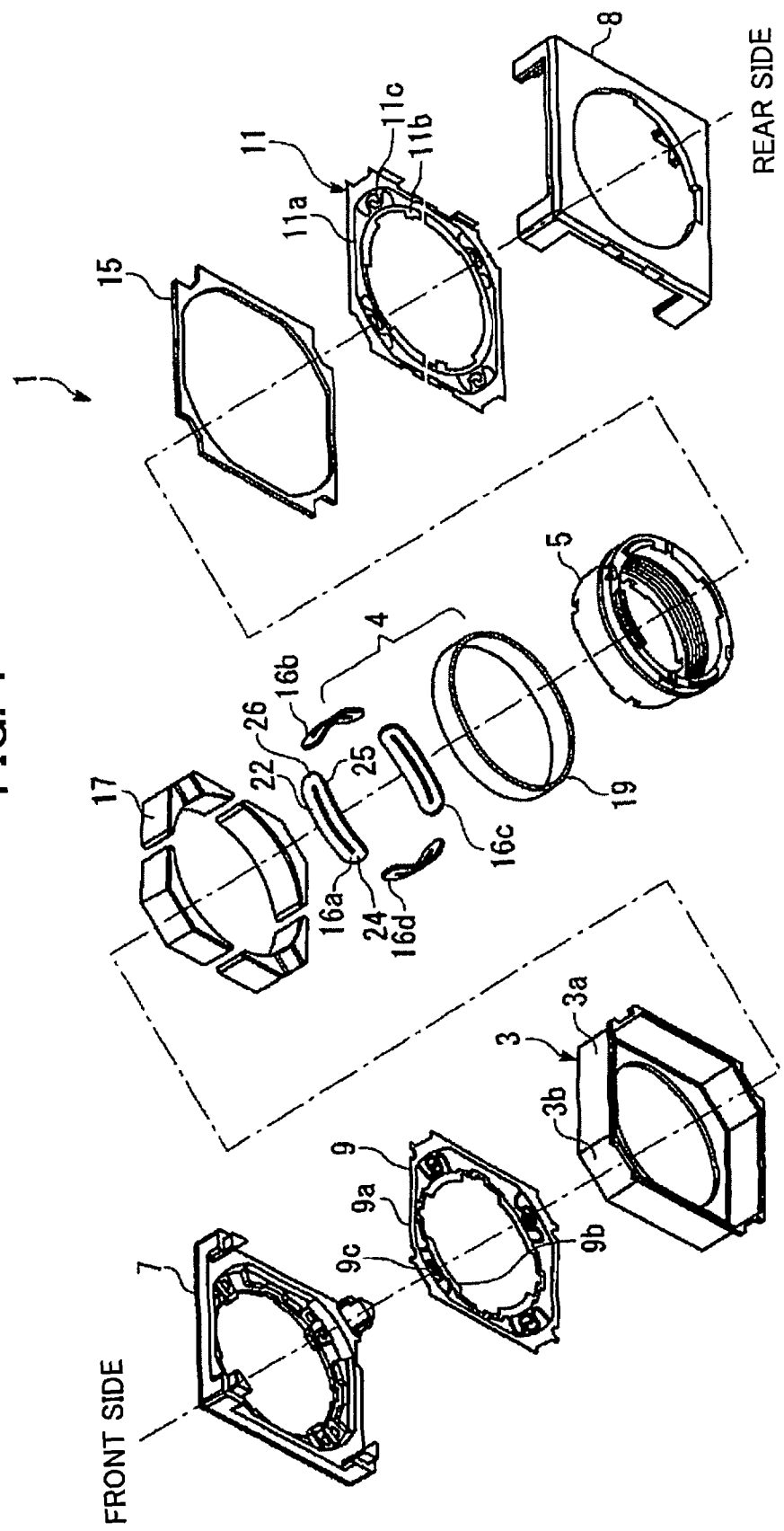
FIG. 1 is a disassembled perspective view of the lens driving device according to the first embodiment.
Figure 3:
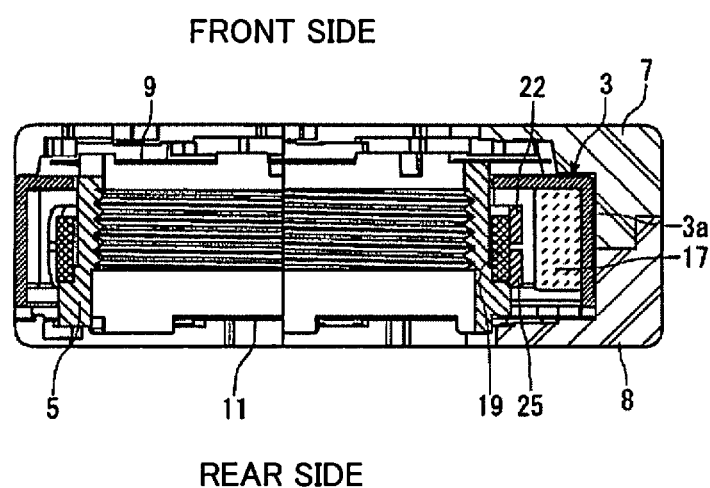
FIG. 3 shows a lens driving device according to the first embodiment, and is a cross sectional view along the line A-A of FIG. 5.

This lens driving device 1, as shown in FIG. 1, is provided with a lens support 5 which supports a lens (not shown) at its inner circumference; a yoke 3 as a fixed member which supports so as to be freely moveable the lens support body 5 at its inner circumferential side; a frame 7 and front side spring 9 disposed at the optical axis direction front side of the lens support 5 and the yoke 3; and a base 8 and rear side spring 11 disposed at the rear side of the yoke 3; and a spacer (insulating member) 15 is disposed between the rear side spring 11 and the yoke 3. As shown in FIG. 1 and FIG. 2, a coil 4 is fixed at the outer circumference of the lens support 5.

As shown in FIG. 1, the outer circumferential side wall 3a of the yoke 3 is formed with an approximately square shape when seen from the front side, and the corner portions 3b of the square have a bevelled shape. An opening portion is provided at the center portion of the yoke 3 where the lens support body 5 is disposed.

As shown in FIG. 2(a), a total of four magnets 17 are fixed at a predetermined interval at the inner circumference of each corner portion 3b of the outer circumferential side wall 3a of the yoke 3. In the present embodiment, the interval of the magnets is an even spacing.

As shown in FIG. 2(a), each magnet 17 is formed to have an approximately trapezoidal shape along the bevelled corner portions 3b of the yoke 3 in a plane seen from the front side, and their inner circumferential side is formed to be arc shaped along the outer circumferential face of the later described first coil 19. Further, the magnetic poles of the inner circumferential side and the outer circumferential side of the magnets 17 differ, for example, the inner circumference side is the N pole and the outer circumference side is the S pole.

As shown in FIG. 1, the lens support 5 has an approximately cylindrical shape, and the lens (not shown) is fixed at its inner circumferential side. The coil member 4 fixed at the outer circumference of the lens support 5 is constituted of the first coil 19, and the second coils 16a, 16b, 16c and 16d.

The first coil 19 forms a toroidal shape wound around the circumferential direction of the lens support 5, and also forms a belt shape.

Moreover, as shown in (a) of FIG. 2, at the outer circumference of the first coil 19, a total of four second coils 16a to 16d are disposed at even intervals (90 degree intervals) at the outer circumference of the first coil 19. As shown in FIG. 1, each of the second coils 16a to 16d is formed with a side planar view toroidal shape when seen from the radial direction outer side of the lens support.

Each of the second coils 16a to 16d is disposed at, and so as to overlap with, the outer circumferential face of the first coil 19, and the front side area portion 22 and the rear side area portion 25 and the left and right area portions 24 and 26 overlap the first coil 19.

Each of the magnets 17 is provided facing the second coils 16a to 16d, and the inner circumferential side face 17a of the magnet 17 faces each of the area portions 22, 25, 24 and 26 of the second coil, and the size in the circumferential direction of the magnet 17 is approximately the same size as the size in the circumferential direction of the second coils 16a to 16d, and in addition, the area of the inner circumferential side face 17a of the magnet 17 is approximately the same area as the area of the facing second coil 16a to 16d.

Further, each magnet 17 is opposite the first coil 19 via the facing second coil 16a to 16d.

For the second coils 16a to 16d, as shown in (b) of FIG. 2, the directions of the magnetic flux leaving from the right (left) side portion of the inner circumferential face of the magnets 17 have components in the radial direction inner direction and the circumferential direction right (left) direction, and curve further towards the right (left) side further away from the inner circumferential face 17a of the magnet 17. Namely, the direction of the magnetic flux has components in the radial direction inner direction and in the left or right directions with respect to the radial direction. In the same way, the magnetic flux leaving from the optical axis direction front side portion of the inner circumferential face 17a of the magnet 17 curve further towards the front direction side further away from the inner circumferential face 17a. Further, the direction of the magnetic flux leaving from the optical axis direction rear side portion of the inner circumferential face 17a of the magnet 17 has components in the radial direction inner direction and the optical axis direction rear direction, and curve further towards the rear direction side further away from the inner circumferential side face 17a.

For example, when an electric current $I_1$ flows in the counterclockwise direction when seen from the front direction side in the first coil 19, the flux linkage in the radial direction inner direction contributes to generating a thrust in the optical axis direction front direction by Fleming's right hand rule, and the lens support 5 moves in the optical axis direction front direction. When an electric current $I_2$ flows in the counterclockwise direction when seen from the outside direction in the second coils 16a to 16d, the flux linkage components in the optical axis direction forwards direction contribute to generating a thrust in the radial direction inner direction at the front area portions 22 of the optical axis direction front of each second coil 16a to 16d. In the same way, a thrust is also generated in the radial direction inner direction at the rear side area portion 25, right side area portion 26, and left side border area 24 of the second coils 16a to 16d. As a result, the lens support 5 moves in the radial direction inner direction.

Moreover, for the second coils 16a and 16c, a thrust E acts in the radial direction of the lens support 5, as shown in (a) of FIG. 2, by the magnetic force of the components orthogonal to the second coils 16a and 16c among the magnetic flux of the magnets 17, and the electric current flowing in the second coils 16a and 16c, and in the same way, for the second coils 16b and 16d, a thrust F acts in the radial direction of the lens support 5. The thrust E and thrust F are orthogonal to each other.

Figure 4:
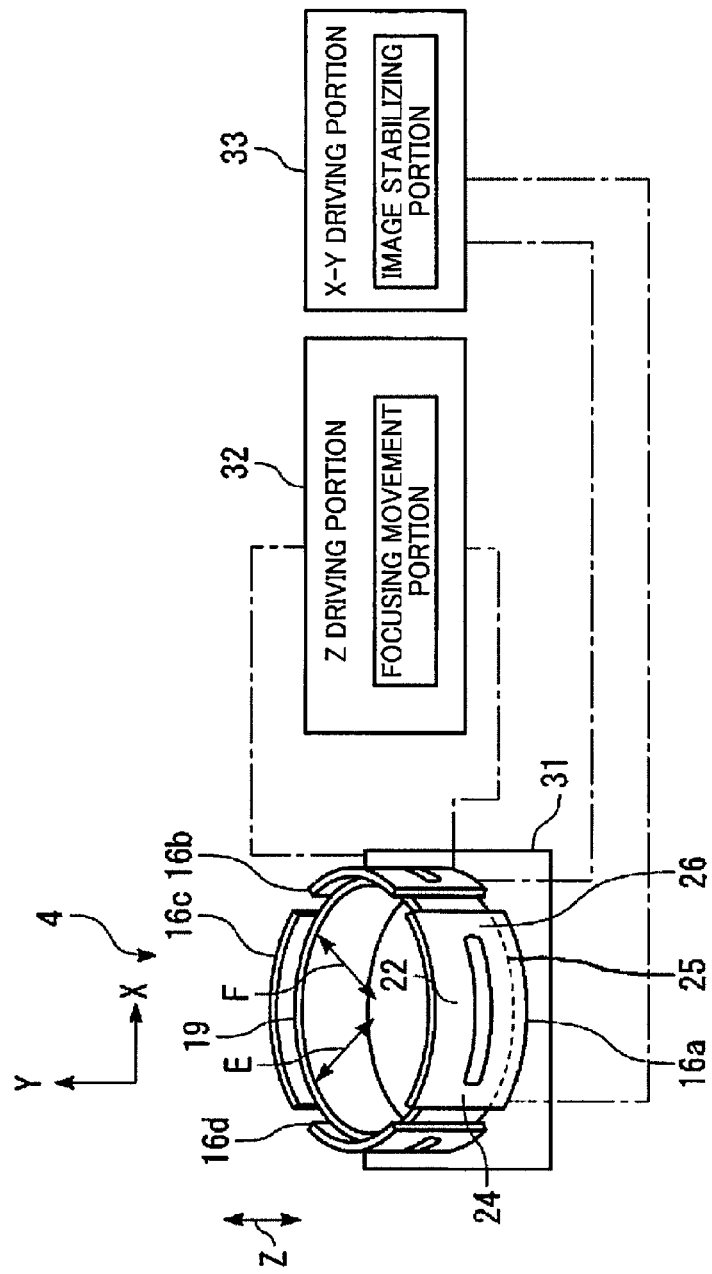
FIG. 4 is a block diagram showing the relationship between the coil member and the driving portion in the autofocus camera according to the first embodiment.
Figure 5:
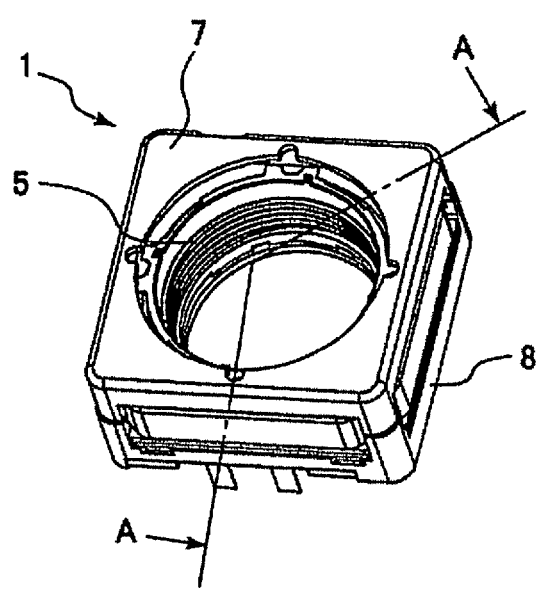
FIG. 5 is a perspective view showing the outer appearance of the lens driving device according to the first embodiment.

As shown in FIG. 4, the first coil 19 is connected to the Z driving portion 32, and each of the second coils 16a to 16d is connected to the X-Y driving portion 33, and an electric current of a predetermined value passes through each driving portion 32 and 33. Also, driving portion 32 connected to a image sensor 31. Further, in FIG. 4, the connecting line of the Z driving portion 32 and the first coil 19 and the connecting line of the X-Y driving portion 33 and the second coils 16a to 16d, shown by dotted lines, show the connection only for the electric input side and the output side.

In the present embodiment, the second coils 16a and 16c, as well as 16b and 16d, are connected in series, and are driven in the direction of the thrust E for the two second coils 16a and 16c, and the direction of the thrust F for 16b and 16d.

For example, in the Z driving portion 32, in the case of moving the lens support 5 to a focus position (movement in the optical axis direction), an electric current Z flows in the first coil 19.

In the same way, in the case of image stabilization, in the X-Y driving portion 33, an electric current E flows in the second coils 16a and 16c and moves the lens support 5 in the E direction, and an electric current F flows in the second coils 16b and 16d and moves the lens support in the F direction. In this way, image stabilization is carried out moving the lens support 5 in the E-F direction.

Further, in FIG. 2 and FIG. 4, the reference symbols Z, E, and F show the size and direction of the thrust arising based on the flowing electric current.

However, as shown in FIG. 2, in the present embodiment, the X direction is the direction of the sides of the square-shaped yoke 3 and the Y direction is the another direction of the yoke 3, and concerning the thrusts E and F generated in the diagonal direction of the yoke 3, the sum of the X direction force components EX and FX acts as the thrust in the X direction, and the sum of the Y direction force components EY and FY acts as the thrust in the Y direction, and in the X-Y driving portion 33, control is carried out by making the sum of each of the force components EX+FX in the X direction equal to the X direction thrust and the sum of the each of the force components EY+FY in the Y direction equal to the Y direction thrust.

As shown in FIG. 1, the front side spring 9 has a plate shape in its natural state before assembly, and is constituted of an outer circumferential side portion 9a forming a planar view rectangular toroid, an inner circumferential side portion 9b which has a planar view arc shape, and is disposed at the inner circumference of the outer circumferential side portion 9a, and four arm portions 9c linking the outer circumferential portion 9a and the inner circumferential portion 9b; and can be freely deformed in the Z direction and in the X-Y direction.

The rear side spring 11 has a plate shape in its natural state before assembly, and is constituted of an outer circumferential side portion 11a forming a planar view rectangular toroid, an inner circumferential portion 11b having a planar view circular shape and disposed at the inner circumference of the outer circumferential portion 11a, and four arm portions 11c linking the outer circumferential portion 11a and the inner circumferential portion 11b.

The outer circumference side portion 9a of the front side spring 9 is interposed between the frame 7 and the yoke 3, and the inner circumferential side portion 9b is fixed to the front end of the lens support 5. The outer circumferential side portion 11a of the rear side spring 11 is inserted between the base 8 and the rear side spacer 15, and the inner circumferential side portion 11b is fixed to the rear end of the lens support 5. In this way, the lens support 5 is supported so as to be freely moveable in the optical axis direction (Z direction) and X-Y direction by the front side spring 9 and the rear side spring 11. At least one of the front side spring 9 and the rear side spring 11 is connected to both ends of the first coil 19, the second coils 16a and 16c, and the second coils 16b and 16d, and also serves as a supply terminal for direct electric current.

Thus, by making an electric current flow in the first coil 19, the lens support 5 moves in the optical axis direction front direction, and the lens support 5 stops at a position where the resultant force in the front-rear direction of the energizing force of the front side spring 9 and the rear side spring 11 and the electromagnetic force generated between the first coil 19 and the magnet 17 are balanced.

In the case of moving the lens support 5 in the X-Y direction, it stops at a position where, by making an electric current of a predetermined value flow in predetermined second coils 16a to 16d, the resultant force of the springs in the X-Y direction of the front side spring 9 and the rear side spring 11, and the electromagnetic force generated between the second coils 16a to 16d and each of the corresponding magnets 17 are balanced.

Next, the assembly, operation and effects of the lens driving device 1 according to the embodiments of the present invention are explained. Before the assembly of the lens driving device 1, the coil member 4 is formed by adhering and fixing each of the second coils 16a to 16d to the outer circumferential face of the first coil 19, and this is fixed to the outer circumference of the lens support 5.

In the assembly of the lens driving device 1, as shown in FIG. 1, the rear side spring 11, the rear side spacer 15, the lens support 5 with the coil member 4 fixed to its outer circumference, the yoke 3 with each of the magnets 17 fixed to its inner circumference side face, the front side spring 9 and the frame 7, are fixed to the base 8 in sequence.

Thus, the assembly of the lens support 5 with the coil member 4 fixed thereto, and the yoke 3 with the magnets 17 fixed to its inner circumferential face is carried out by inserting the lens support 5 into the inner circumference of the yoke 3 from its rear side towards its front side.

Then, the input terminal and output terminal of the first coil 19 are connected to the Z driving portion 32, and after connecting in series the second coils 16a and 16c, as well as 16b and 16d, the input terminal and output terminal for the second coils 16a to 16d are connected to the X-Y driving portion 33.

In the driving of the lens driving device 1 according to the present embodiment, in FIG. 4, the Z driving portion 32, while comparing the peaks of the high frequency components (contrast) received from the image sensor 31, moves the lens support 5 in a straight line in the Z direction towards the focus position.

When the lens support 5 is moved in a straight line in the Z direction, it stops at a position where the electromagnetic force generated with the magnet 17 which is generated by making an electric current value Z flow in the first coil 19, and the resultant force of the energizing forces of the front side spring 9 and the rear side spring 11 are balanced.

Further, in the X-Y control of the lens support 5 (image stabilization), the size of the hand shake amount in the XY direction from a gyro module or the like is received as a signal, the amount of image stabilization in the X direction and Y direction is calculated and the movement amounts E and F of the second coils 16a to 16d are determined, and current is passed through the second coils 16a and 16c, as well as the second coils 16b and 16d.

According to the present embodiment, the focusing movement of the lens support 5 is carried out by moving the lens support in the optical axis direction by passing a current through the first coil 19, and image stabilization is carried out by moving the lens support in the X-Y direction by passing an electric current of a predetermined value through selected second coils 16a to 16d. In this way, it is possible to carry out the focusing movement and the image stabilization movement of the lens support 5.

According to the present embodiment, the magnets 17 concurrently serve for the focusing movement and for the image stabilization movement, and it is possible to move the lens support 5 in the optical axis direction and in the X-Y direction with one first coil 19, four second coils 16a to 16d, and four magnets 17. Therefore, it is possible to carry out focusing movement and image stabilization movement of the lens support 5 with a simple constitution and a small number of parts.

By disposing the magnets 17 and the second coils 16a to 16d which function for image stabilization at the corner portions 3b which have depth of the yoke 3 having a planar view square shape seen from the front side, it is possible to make the constitution the same size as a lens driving device which is not provided with an image stabilization function, while providing image stabilization, and to make the constitution compact.

A different embodiment of the present invention is explained below, but in the below explained embodiment, the portions showing the same operational effects as in the above described first embodiment are assigned the same reference numbers, explanations of these portions are omitted, and in the below explanation, the principal points of difference from the first embodiment are explained.

Figure 6:
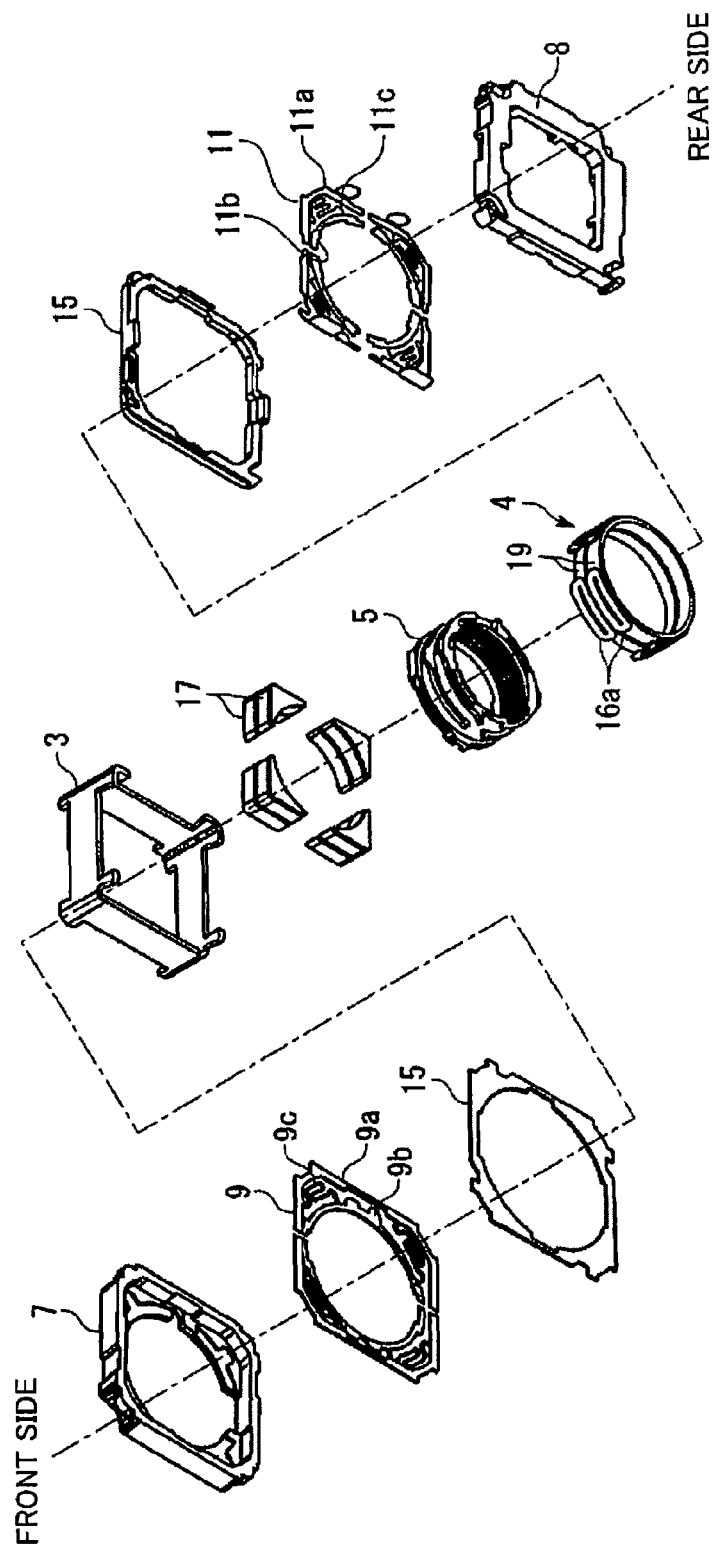
FIG. 6 is a disassembled perspective view of the lens driving device according to the second embodiment.
Figure 7:
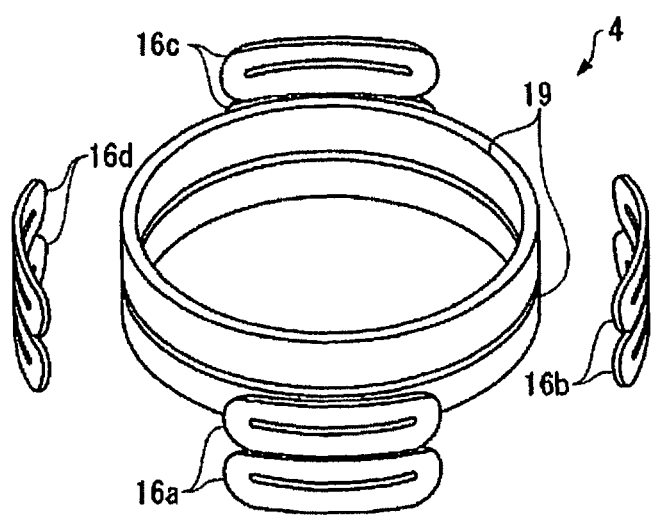
FIG. 7 is a disassembled perspective view of the coil according to the second embodiment.
Figure 8:
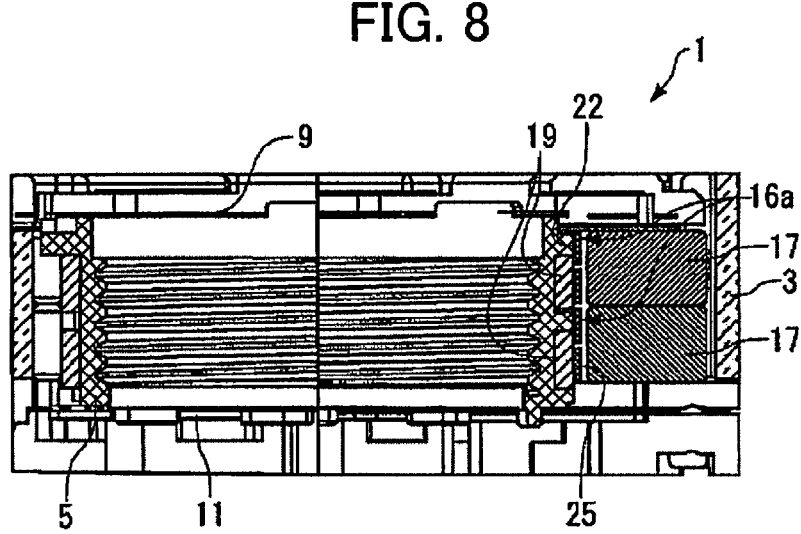
FIG. 8 is a cross sectional view showing a cross section at the same position as the A-A position shown in FIG. 5 of the first embodiment, of the lens driving device according to the second embodiment.

The lens driving device according to the second embodiment is explained with reference to FIG. 6 to FIG. 8. In this second embodiment, two first coils 19, 19 are provided in a line in the optical axis direction, and corresponding thereto, two sets of second coils 16a to 16d and magnets 17 are provided.

According to this second embodiment, in addition to showing the same operational effects of the lens driving device according to the first embodiment, it is possible to approximately double the thrust of the lens driving device according to the first embodiment, for both the thrust Z in the optical axis direction and the thrusts E, F in the radial direction.

Figure 9:
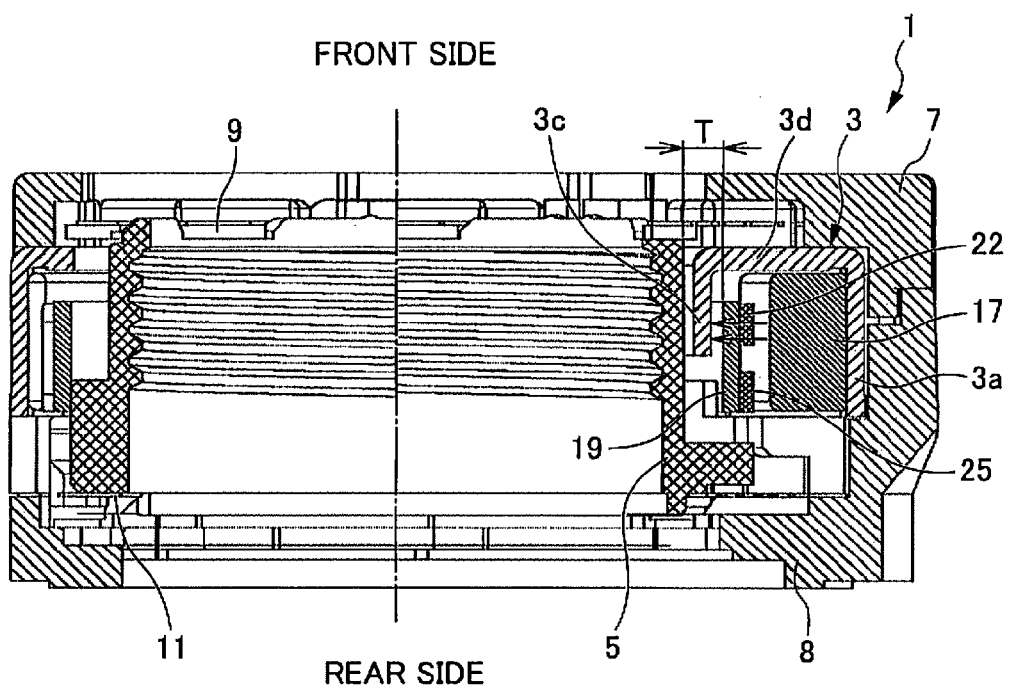
FIG. 9 is a cross sectional view showing a cross section at the same position as the A-A position shown in FIG. 5 of the first embodiment, of the lens driving device according to the third embodiment.

The lens driving device according to the third embodiment will be explained with reference to FIG. 9 to FIG. 11. In this third embodiment, the yoke 3 is provided with an outer circumferential side wall 3a and an inner circumferential side wall 3c positioned at the inner circumference of the outer circumferential side wall 3a, and a connecting wall 3d which connects the outer circumferential side wall 3a and the inner circumferential side wall 3c, and the inner circumferential side wall 3c is provided at a location corresponding to the corner portions 3b. As shown in FIG. 9, the corner portions 3b of the yoke 3 have a cross sectional shape which is approximately a squared letter "U" shape formed by the outer circumferential side wall 3a, inner circumference side wall 3c and connecting wall 3d.

Further, the coil member 4 is disposed so as to form an opening T at the outer circumference of the lens support 5, and the inner circumferential side wall 3c of the yoke 3 is inserted from the front side of the lens support 5 into this opening T. The inner circumferential side wall 3c of the yoke 3 is disposed between the lens support 5 and the first coil 19, at a position corresponding to the front side area portion 22 of each of the second coils 16a to 16d.

Figure 11:
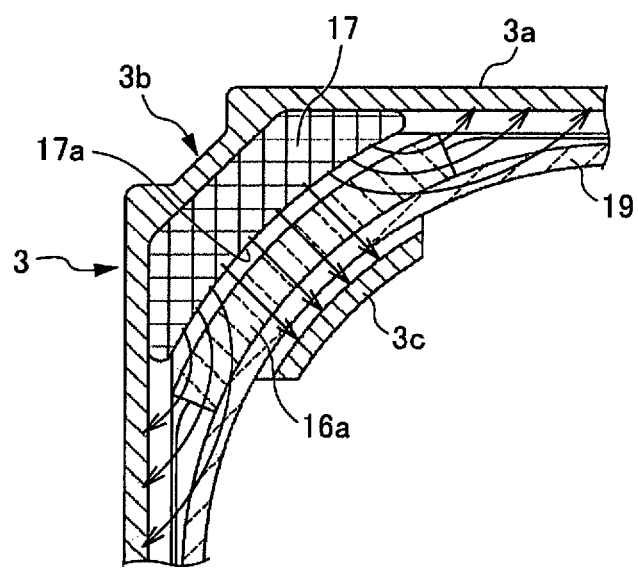
FIG. 11 is a horizontal cross sectional view of the corner portion of the yoke of the lens driving device according to the third embodiment.

According to this third embodiment, in addition to providing the same operational effects as the first embodiment, as shown in FIG. 9 and FIG. 11, the front side portion of the first coil 19 is positioned between the outer circumferential side wall 3a and the inner circumferential side wall 3c of the yoke 3, and the magnetic flux density imparted to this portion is increased, thus it is possible to increase the thrust in the Z direction operating on the first coil 19. In this way, it is possible to provide increase the thrust in the Z direction compared to the first embodiment and the second embodiment.

Figure 10:
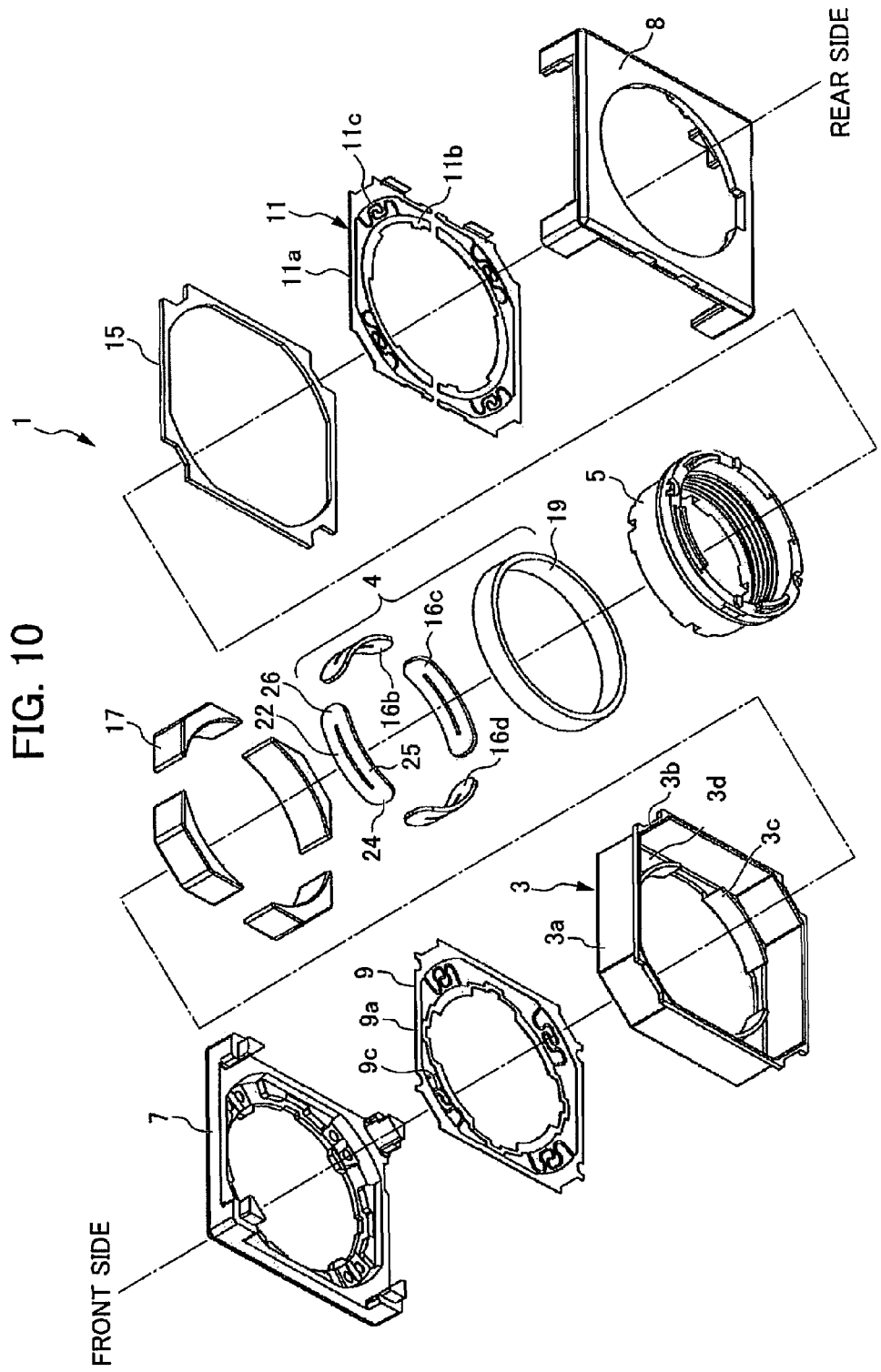
FIG. 10 is a disassembled perspective view of the lens driving device according to the third embodiment.

Further, as shown in FIGS. 10 and 11, at the second coils 16a to 16d, at the left and right side area portions 24 and 26, in the same way as in the first embodiment, a magnetic flux which curves further in the right and left directions further away from the inner circumferential face 17a of the magnets 17 operates, thus a thrust which moves the lens support 5 in the X-Y direction is generated. In the same way, a thrust which moves the lens support 5 in the X-Y direction also arises at the rear side area portion 25.

The present invention is not limited to the above-described embodiments, and many modifications are possible within a scope that does not deviate from the gist of the present invention. For example, the first embodiment is not limited to providing the second coils 16a to 16d and the magnets 17 at the corner portions 3b of the yoke, provided that they are at 90 degree intervals with respect to each other in the circumferential direction.

The first embodiment is not limited to the yoke 3 having corner portions 3b, and it may have a shape which is circular in planar view seen from the front side.

Only two of the second coils 16a to 16d may be provided side by side with a 90 degree interval between them.

The first embodiment is not limited to providing four of the magnets 17, and one magnet formed as a toroid may be provided, for example, it may be one where the inner circumferential face of the toroidal magnet is the N pole, the outer circumferential face is the S pole, and the magnetic polarities of the inner circumferential face and the outer circumferential face differ. At the left side area portion 24, and the right side area portion 26, because the direction of the magnetic flux does not have a component in the circumferential direction, driving power is not generated in the radial direction, in this case, driving power is generated front side portion 22 and rear side portion 25. However, because the magnetic flux from the toroidal magnet about the entire circumference link with the first coil 19, it is possible to increase the driving force in the optical axis direction.

In the first and second embodiments, the second coils 16a to 16d may be disposed at the inner circumferential side of the first coil 19.

Figure 12:
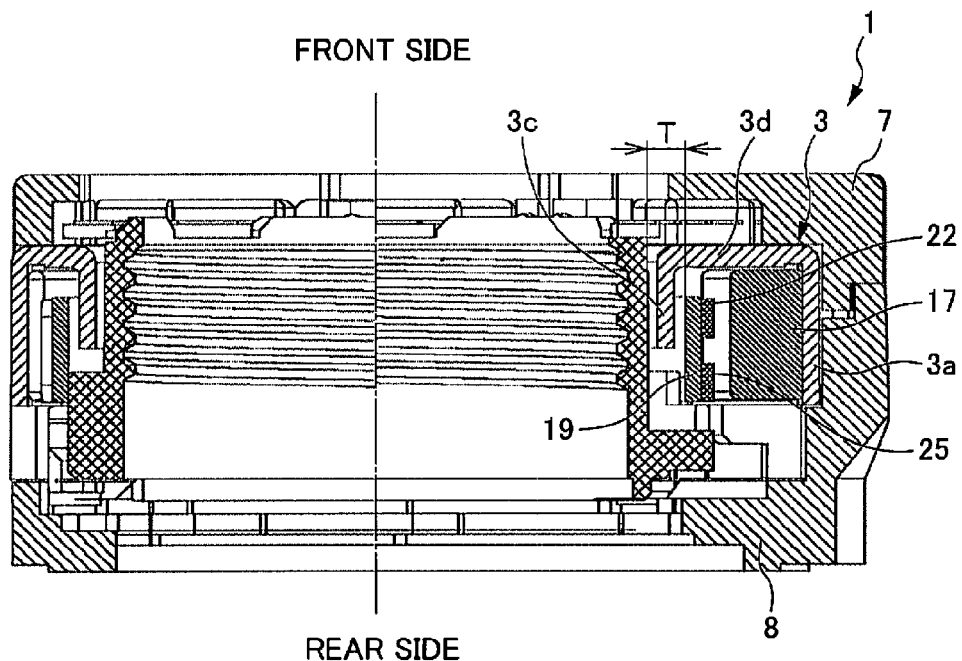
FIG. 12 is a cross sectional view showing a cross section at the same position as the A-A position shown in FIG. 5, of the lens driving device according to a modified example of the third embodiment.
Figure 13:
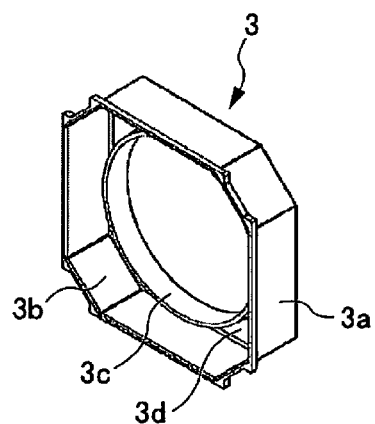
FIG. 13 is a perspective view of the yoke of the lens driving device according to a modified example of the third embodiment.

In the third embodiment, the inner circumferential side wall 3c, as shown in FIG. 12 and FIG. 13, may be provided continuously along the circumferential direction.

In the embodiments described above, the lens driving device 1 may be provided with a zoom lens, and the zooming function may be combined therewith.

Figure 14:
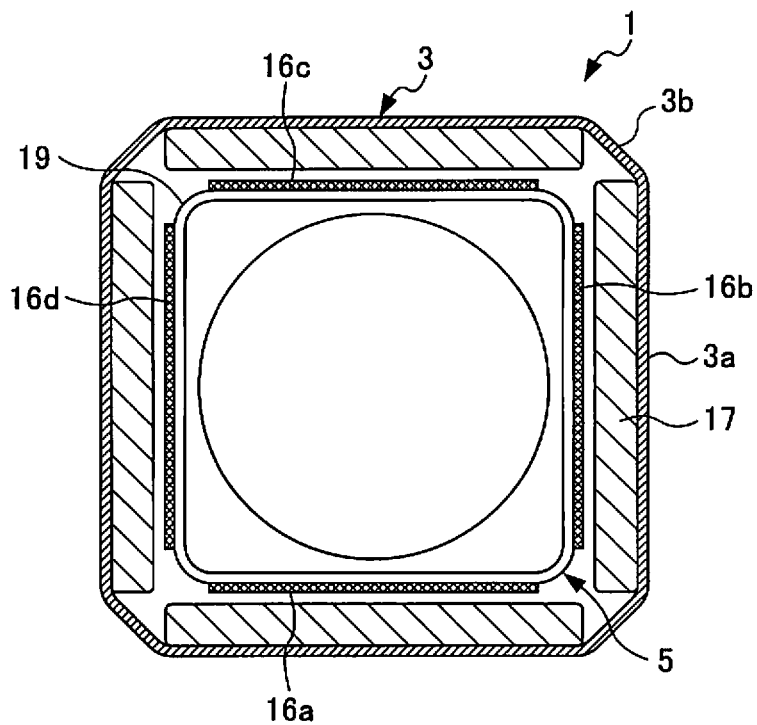
FIG. 14 is a horizontal cross sectional view of a lens driving device according to a modified example of the first embodiment.

In the third embodiment, as shown in FIG. 14, the first coil 19 is formed with an approximately square shape when seen from the front side, the second coils 16a to 16d may be disposed at sides of the first coil 19, and four of the magnets 17 are disposed at sides of the square yoke 3. In this case, as the thrust directions of the second coils 16a to 16d are X or Y, control is not needed making the sum of each of the force components EX+FX and EY+FY.

Figure 15:
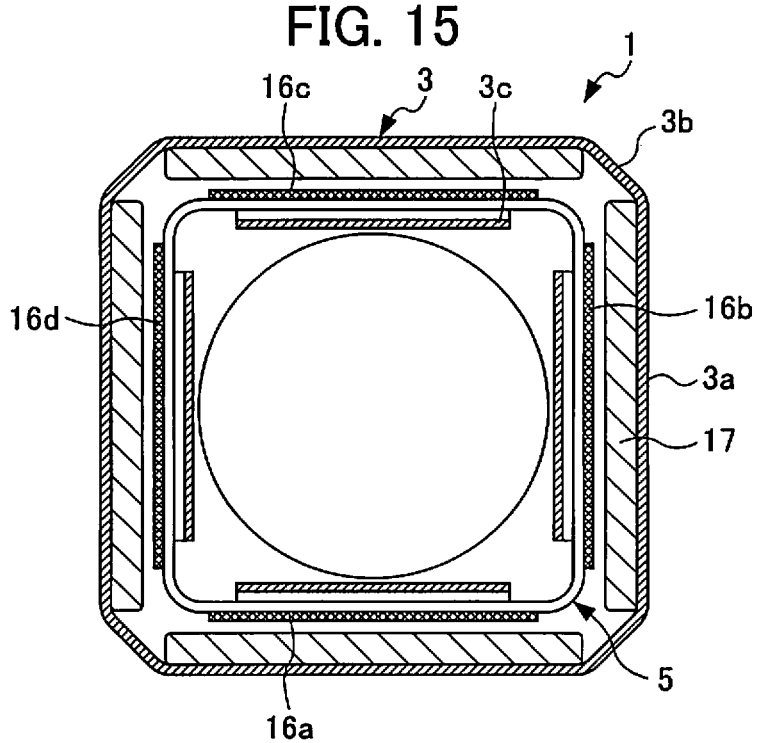
FIG. 15 is a horizontal cross sectional view of a lens driving device according to a modified example of the first embodiment.

In the modified embodiment as shown in FIG. 15, as like the third embodiment, inner circumferential side wall 3c is provided opposite to side of yoke 3.

What is claimed is:

1. A lens driving device for moving a lens in an optical axis direction, comprising:
   a lens support for supporting a lens in an inner circumference;
   a fixed member which supports so as to be freely moveable the lens support at an inner circumferential side;
   a first coil fixed to the lens support and wound around an outer circumference of the lens support in a circumferential direction;

at least two second coils fixed on an outer circumferential face of the first coil and disposed with a 90 degree interval in the circumferential direction at the outer circumference of the lens support, the second coils having a toroidal form when seen from a radial direction outer side of the lens support;

at least four magnets provided at the fixed member, and provided at a predetermined interval about the circumferential direction of the first coil, each magnet being provided so that an inner circumferential face is the same magnetic pole, and so that the inner circumferential face is opposite an outer circumferential face of the first coil, directly opposite and encompassing an entire toroidal face of a respective second coil and, in addition, is opposite a radial direction outer side face of the lens support at the second coil at the position of providing the second coil; wherein when moving the lens support in the optical axis direction, an electric current flows in the first coil, and when moving the lens support in an X-Y direction orthogonal to the optical axis, a predetermined electric current flows in a predetermined second coil.

2. The lens driving device according to claim 1, characterized in that the fixed member is provided with a yoke having an outer circumferential side wall at an outer circumferential side of the magnet, the outer circumferential side wall of the yoke being formed to have a planar view approximately square shape when seen from the front side, and the magnets and the second coils being disposed at corner portions of the yoke.

3. The lens driving device according to claim 1, characterized in that the fixed member is provided with a yoke with a toroidal shape, and the yoke is provided with an outer circumferential side wall, an inner circumferential side wall positioned at an inner circumference of the outer circumferential side wall, and a connecting wall connecting the inner circumferential side wall and the outer circumferential side wall, and the magnets are provided at an inner circumferential side of the outer circumferential side wall of the yoke, and the inner circumferential side wall of the yoke is disposed between the lens support and the first coil.

4. The lens driving device according to claim 1, characterized in that a plurality of the first coils are provided in the optical axis direction, and the second coils and the magnets are provided corresponding to each of the first coils.

5. An autofocus camera comprising the lens driving device according to claim 1, and an image sensor provided at an image forming side of the lens of the lens support.

6. A camera-equipped mobile terminal comprising the autofocus camera according to claim 5.

7. A lens driving device for moving a lens in an optical axis direction, comprising:

a lens support which supports a lens in an inner circumference;

a fixed member which supports so as to be freely moveable the lens support at an inner circumferential side;

a first coil fixed to the lens support and wound around an outer circumference of the lens support in a circumferential direction;

at least two second coils fixed on an outer circumferential face of the first coil and disposed with a 90 degree interval in the circumferential direction at the outer circumference of the lens support, the second coils having a toroidal form when seen from a radial direction outer side of the lens support;

a toroidal magnet provided at the fixed member, and provided along the circumferential direction of the first coil, the magnet being provided so that magnetic poles of an inner circumferential face and an outer circumferential face are different, and so that the inner circumferential face is opposite the outer circumferential face of the first coil, directly opposite and encompassing an entire toroidal face of the second coils and, in addition, is opposite a radial direction outer side face of the lens support body at the second coil at a position of providing the second coil; wherein when moving the lens support in the optical axis direction, an electric current flows in the first coil, and when moving the lens support in an X-Y direction orthogonal to the optical axis, a predetermined electric current flows in a predetermined second coil.

8. The lens driving device according to claim 7, characterized in that the fixed member is provided with a yoke with a toroidal shape, and the yoke is provided with an outer circumferential side wall, and inner circumferential side wall positioned at an inner circumference of the outer circumferential side wall, and a connecting wall connecting the inner circumferential side wall and the outer circumferential side wall, and the magnets are provided at an inner circumferential side of the outer circumferential side wall of the yoke, and the inner circumferential side wall of the yoke is disposed between the lens support and the first coil.

9. The lens driving device according to claim 7 characterized in that a plurality of the first coils are provided in the optical axis direction, and the second coils and the magnet are provided corresponding to each of the first coils.

10. An autofocus camera comprising the lens driving device according to claim 7 and an image sensor provided at an image forming side of the lens of the lens support.

11. A camera-equipped mobile device comprising the autofocus camera according to claim 10.

* * * * *